(12) United States Patent
Park et al.

(10) Patent No.: US 8,490,655 B2
(45) Date of Patent: Jul. 23, 2013

(54) VALVE UNIT, MICROFLUIDIC DEVICE HAVING THE SAME, AND METHOD OF DRIVING THE VALVE UNIT

(75) Inventors: Jong Myeon Park, Incheon-si (KR); Do Gyoon Kim, Seongnam-si (KR); Sang Bum Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 12/938,777

(22) Filed: Nov. 3, 2010

(65) Prior Publication Data

US 2011/0100476 A1    May 5, 2011

(30) Foreign Application Priority Data

Nov. 3, 2009    (KR) .................. 10-2009-0105349

(51) Int. Cl.
*F15C 1/04*    (2006.01)
(52) U.S. Cl.
USPC ............ 137/828; 137/13; 137/74; 137/251.1; 251/11; 422/63; 422/502
(58) Field of Classification Search
USPC ............. 137/74, 13, 827, 828, 251.1; 251/11; 422/502, 503, 507, 63, 64, 68.1, 72
See application file for complete search history.

(56) References Cited

U.S. PATENT DOCUMENTS

| | | | | |
|---|---|---|---|---|
| 6,102,897 A * | 8/2000 | Lang | ............................ | 604/246 |
| 7,104,517 B1 * | 9/2006 | Derand et al. | .................. | 251/11 |
| 7,175,772 B2 * | 2/2007 | Eldridge | ........................... | 216/2 |
| 7,819,138 B2 * | 10/2010 | Lee et al. | ...................... | 137/827 |
| 7,837,948 B2 * | 11/2010 | Park | .............................. | 422/502 |
| 7,926,514 B2 * | 4/2011 | Park et al. | ...................... | 137/828 |
| 7,951,332 B2 * | 5/2011 | Cho et al. | ........................ | 422/72 |
| 8,105,551 B2 * | 1/2012 | Park et al. | ..................... | 422/502 |
| 8,191,715 B2 * | 6/2012 | Cho et al. | ................... | 210/380.1 |
| 8,221,704 B2 * | 7/2012 | Park et al. | ..................... | 422/537 |
| 2007/0092409 A1 | 4/2007 | Beatty et al. | | |
| 2008/0029158 A1 * | 2/2008 | Park et al. | ....................... | 137/76 |
| 2008/0112855 A1 * | 5/2008 | Lee et al. | ...................... | 422/103 |
| 2008/0187474 A1 * | 8/2008 | Park et al. | ..................... | 422/292 |
| 2008/0193336 A1 * | 8/2008 | Cho et al. | ...................... | 422/100 |

(Continued)

FOREIGN PATENT DOCUMENTS

KR    10-2009-0014871 A    2/2009
KR    10-2009-0020086 A    2/2009

OTHER PUBLICATIONS

International Search Report dated May 20, 2011 in counterpart International Application No. PCT/KR2010/007601.

*Primary Examiner* — Eric Keasel
*Assistant Examiner* — Minh Le
(74) *Attorney, Agent, or Firm* — Sughrue Mion, PLLC (57) ABSTRACT

A normally open valve unit to close a channel, a microfluidic device equipped with the same, and a method of driving the valve unit are provided. The valve unit includes a valve substance including a phase transition material, a valve substance chamber which communicates with the channel and in which the valve substance is disposed, and a fusion structure formed in a section of the channel in which, wherein when the valve substance contained in the valve substance chamber is fused by applied energy and flows into the section of the channel in which the fusion structure is formed, and the valve substance is heated to melt the fusion structure and conduct fused bonding of the channel, thereby closing the channel.

31 Claims, 11 Drawing Sheets

U.S. PATENT DOCUMENTS

| | | | |
|---|---|---|---|
| 2008/0314465 A1* | 12/2008 | Park et al. | 137/827 |
| 2009/0044875 A1* | 2/2009 | Griss et al. | 137/828 |
| 2009/0053108 A1* | 2/2009 | Cho et al. | 422/72 |
| 2009/0139578 A1* | 6/2009 | Kim et al. | 137/13 |
| 2011/0049398 A1* | 3/2011 | Park et al. | 251/11 |
| 2012/0180894 A1* | 7/2012 | Sugahara | 137/827 |

* cited by examiner

VALVE UNIT, MICROFLUIDIC DEVICE HAVING THE SAME, AND METHOD OF DRIVING THE VALVE UNIT

CROSS-REFERENCE TO RELATED APPLICATION

This application claims priority from Korean Patent Application No. 2009-105349 filed on Nov. 3, 2009 in the Korean Intellectual Property Office, the disclosure of which is incorporated herein by reference.

BACKGROUND

1. Field

Apparatuses and methods consistent with exemplary embodiments relate to a valve unit, a microfluidic device having the same and a method for driving the valve unit and, more particularly, to a valve unit for control of a micro fluid flow, a microfluidic device equipped with the same and a method of driving the valve unit for control of a fluid flow.

2. Description of the Related Art

A microfluidic device is utilized to conduct biological or chemical reactions by operating upon a small amount of fluid. The microfluidic device has a microfluidic structure provided in a platform in different forms or shapes such as a chip, a disk, etc.

The microfluidic structure typically has a chamber to receive a fluid therein, a channel through which the fluid passes or flows and a valve to control the fluid flow, wherein the chamber, channel and valve are combined and arranged according to different assembly designs.

In order to conduct various experiments including biochemical reactions on a chip, a microfluidic structure is arranged on a chip type platform what is referred to as a 'bio-chip.' Especially, a device fabricated for multi-stage treatment and/or operation on a single chip is referred to as a 'lab-on-a chip'.

In order to flow and transport a fluid in a microfluidic structure of a microfluidic device, a driving pressure is generally required. The driving pressure may be capillary pressure or pressure generated using an alternative pump may be used. In recent years, a centrifugal microfluidic device having a microfluidic structure mounted on a disk type platform, capable of conducting a series of operations while shifting a fluid by centrifugal force has been proposed. The microfluidic device is often referred as a lab compact disk (CD) or a lab-on-a CD.

The valve of the microfluidic device may be operated in a magnetic control manner or using a phase transition material, so as to open and close a channel.

For use of a phase transition material, a normally open valve is operated by installing a chamber to receive the phase transition material close to a channel and heating the phase transition material to flow into the channel, in turn closing the channel.

However, a microfluidic device using centrifugal force to transport a fluid has a disadvantage in that a channel may not be completely closed using a phase transition material.

Some processes such as DNA extraction, induction of polymerase chain reaction, etc. are implemented at a relatively high temperature. A phase transition material generally has poor heat tolerance and entails a problem in that the phase transition material closing a channel is fused in a high temperature environment, in turn opening the channel even in the case where the channel must be closed.

SUMMARY

Exemplary embodiments provide a normally open valve unit to permanently close a channel during driving of a valve, a microfluidic device equipped with the valve unit, and a method of driving the valve unit are provided.

Exemplary embodiments also provide a valve unit to continuously close a channel independent of temperature during driving of a valve, a microfluidic device equipped with the valve unit, and a method of driving the valve unit are provided.

According to an aspect of an exemplary embodiment, there is provided a valve unit which opens and closes a channel, the valve unit including: a valve substance containing a phase transition material; a valve substance chamber which communicates with the channel and receives the valve substance; a micro-channel part provided in the channel; and a fusion structure formed in the micro-channel part, wherein the valve substance contained in the valve substance chamber is fused by applied energy and flows into the micro-channel part, and the valve substance in the micro-channel part is heated to melt the fusion structure and conduct fused bonding of the channel, in turn closing the channel.

The valve unit may be included in a rotational disk type microfluidic device and the microfluidic device may typically include a first plate and a second plate combined with the first plate in order to isolate the valve substance chamber from the channel.

The valve unit may further include a guidance channel to guide the fused valve substance to the micro-channel part when the valve substance contained in the valve substance chamber is fused.

The fusion structure may further have at least one first fusion structure protruded from the micro-channel part and extended in a flow direction of the fluid.

The fusion structure may further have a second fusion structure protruded from a lateral side of the micro-channel part.

The first and second plates may be formed using thermoplastic resin.

The valve substance may further include a micro-exothermic material which is dispersed in the phase transition material and absorbs electromagnetic radiation to emit heat energy.

The micro-exothermic material may include, for example: at least one selected from a group consisting of polymer beads, quantum dots, gold nanoparticles, silver nanoparticles, metallic compound beads, carbon particles and magnetic beads; metal oxide particles; dyes generating heat by electromagnetic radiation, and so forth.

The phase transition material may include at least one selected from wax, gel and thermoplastic resins.

The wax may include at least one selected from paraffin wax, microcrystalline wax, synthetic wax and natural wax.

The gel may include at least one selected from polyacrylamide, polyacrylate, polymethacrylate and polyvinylamide.

The thermoplastic resin may include at least one selected from cyclic olefin copolymer (COC), polymethylmethacrylate (PMMA), polycarbonate (PC), polystyrene (PS), polyoxymethylene (POM), perfluoralkoxy (PFA), polyvinylchloride (PVC), polypropylene (PP), polyethylene tetraphthalate (PET), polyetheretherketone (PEEK), polyamide (PA), polysulfone (PSU) and polyvinylidene fluoride (PVDF).

The channel described in the embodiment may have a height of 0.01 to 1.0 mm and a height of the micro-channel part may range from 5 to 10 μm.

The micro-channel part may be formed in a constant section of the foregoing channel and has a smaller cross-sectional area than that of the channel.

According to an aspect of another exemplary embodiment, there is provided a microfluidic device including a channel to provide a flow path of a fluid and a valve unit to open and close the channel, wherein the valve unit includes: a valve substance containing a phase transition material; a valve substance chamber which communicates with the channel and receives the valve substance; and a fusion structure formed in the channel, and wherein the valve substance contained in the valve substance chamber is fused by applied energy and flows into the fusion structure, and the valve substance in the fusion structure is heated to melt the fusion structure and conduct fused bonding of the channel.

The valve substance may further contain a micro-exothermic material which is dispersed in the phase transition material and absorbs electromagnetic radiation to emit heat energy.

The microfluidic device may further include a micro-channel part located in a constant section having a narrower cross-sectional area than those of other sections in the channel. The fusion structure is formed in the micro-channel part and is designed to enable a fluid to easily pass through the micro-channel part.

The fusion structure may be integrated with the microfluidic device by injection molding.

In order to fuse the valve substance and flow the fused substance into the micro-channel part, heat or electromagnetic radiation is applied to the valve substance.

The fusion structure may include at least one first fusion structure extended in a flow direction of the fluid and a second fusion structure protruded from a lateral side of the micro-channel part.

According to an aspect of an exemplary embodiment, there is provided a method of driving a valve unit assembly which includes a channel to provide a flow path of a fluid, a valve unit to open and close the channel, a valve substance chamber to receive a phase transferable valve substance depending on temperature and a fusion structure formed in the channel, the method including: applying energy to the valve substance to fuse the same; flowing the fused valve substance into the fusion structure; and heating the valve substance in the fusion structure up to at least a melting point of the fusion structure, enabling fused bonding of the channel and closing the same.

The valve substance contains a phase transition material and a micro-exothermic material which is dispersed in the phase transition material and absorbs electromagnetic radiation from an external source to emit heat energy. In order to heat the valve substance up to at least a melting point of the fusion structure, the valve substance is subjected to electromagnetic radiation for a desired time to heat the micro-exothermic material.

For application of energy to the valve substance, a non-contact heater is driven for a desired time to heat the valve substance.

Alternatively, for application of energy to the valve substance, a light source is used for electromagnetic radiation so as to heat the valve substance.

The fused valve substance flows into the fusion structure by decreasing a cross-sectional area of the channel having the fusion structure formed therein so as to guide the fused valve substance to the fusion structure by capillary action.

Fusion of the valve substance by energy application and the heating process of the same up to at least a melting point of the fusion structure are performed by continuous electromagnetic irradiation.

As described above, the valve unit according to exemplary embodiments has a fusion structure in a channel and heats a valve substance up to at least a melting point of the fusion structure to conduct fused bonding of the channel, thereby closing the channel.

In addition, since the fusion structure is heated using the valve substance so as to melt and close the channel, channel opening caused by fusion of the valve substance may be efficiently prevented even in the case where the valve unit is used for assays requiring high temperature environments.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION

Hereinafter, a valve unit, a microfluidic device equipped with the same, and a method of driving the valve unit according to exemplary embodiments will be clearly understood through the following detailed description with reference to the accompanying drawings.

The same numerical symbols in the drawings refer to substantially the same configured elements. Separate structures such as a chamber, a channel, and the like are simply illustrated and dimensional ratios of the same may be different from real scales thereof, instead, being enlarged or reduced. In expressions 'microfluidic device,' 'micro-particle,' etc., 'micro' is not limitedly construed as a size unit but used in contrast with 'macro.'

Figure 1:
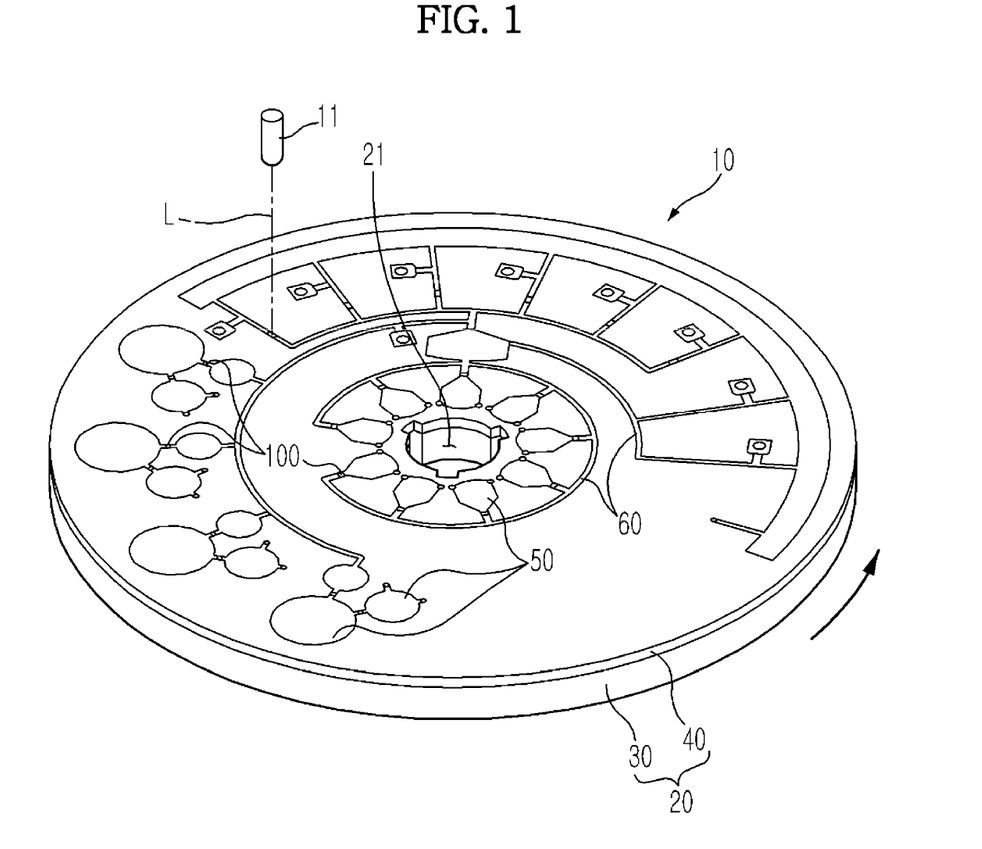
FIG. 1 is a perspective view illustrating a microfluidic device according to an exemplary embodiment.

FIG. 1 is a perspective view illustrating a microfluidic device according to an exemplary embodiment. Referring to FIG. 1, a microfluidic device 10 according to the exemplary embodiment has a rotational disk type platform 20.

The platform 20 may be formed using plastic materials such as acryl, polydimethylsiloxane (PDMS), etc., each of which is easily formable and has a biologically inactive surface. However, a raw material for fabrication of the platform is not particularly limited and may include any materials with chemical or biological stability, optical transparency and/or mechanical workability.

The platform 20 may be formed of a multi-layered plate, and one or more chambers and one or more channels may be provided inside the platform by forming engraved structures corresponding to the chamber and the channel on a face at which one layer comes into contact with another layer, and then, adhering these structures to the face.

The platform 20 may include, for example, a first plate 30 and a second plate 40 attached to the first plate. The first and second plates 30 and 40 may be formed using thermoplastic resin.

The first plate 30 may be combined with the second plate 40 using adhesive or a double-sided adhesive tape, or other methods including ultrasonic welding, laser welding, and the like.

The microfluidic device 10 includes at least one chamber 50 to receive a fluid, at least one channel 60 connected to the chamber 50 to provide a fluid path, and a valve unit 100 for opening and closing the channel so as to control a flow of the fluid. Furthermore, the microfluidic device 10 may be mounted on a spindle motor (not shown) for high speed rotation. A fixation hole 21 is formed in the center of the micro fluidic device 10 in order to fix the same to the spindle motor. A fluid remaining in the chamber 50 or channel 60 of the microfluidic device 10 is forced toward an outer circumference (or a periphery) of the platform 20, using centrifugal force generated by rotation of the spindle motor.

The chamber 50, the channel 60 and/or the valve unit 100 are appropriately arranged for particular uses of the microfluidic device 10 in biochemical applications, for example, centrifugation of a fluid specimen, immunoserum response, genetic analysis, gene extraction, gene amplification, and so forth. For example, alignment of the chamber 50, the channel 60 and the valve unit 100 is not particularly limited but may have a number of designs in consideration of use thereof.

Figure 2:
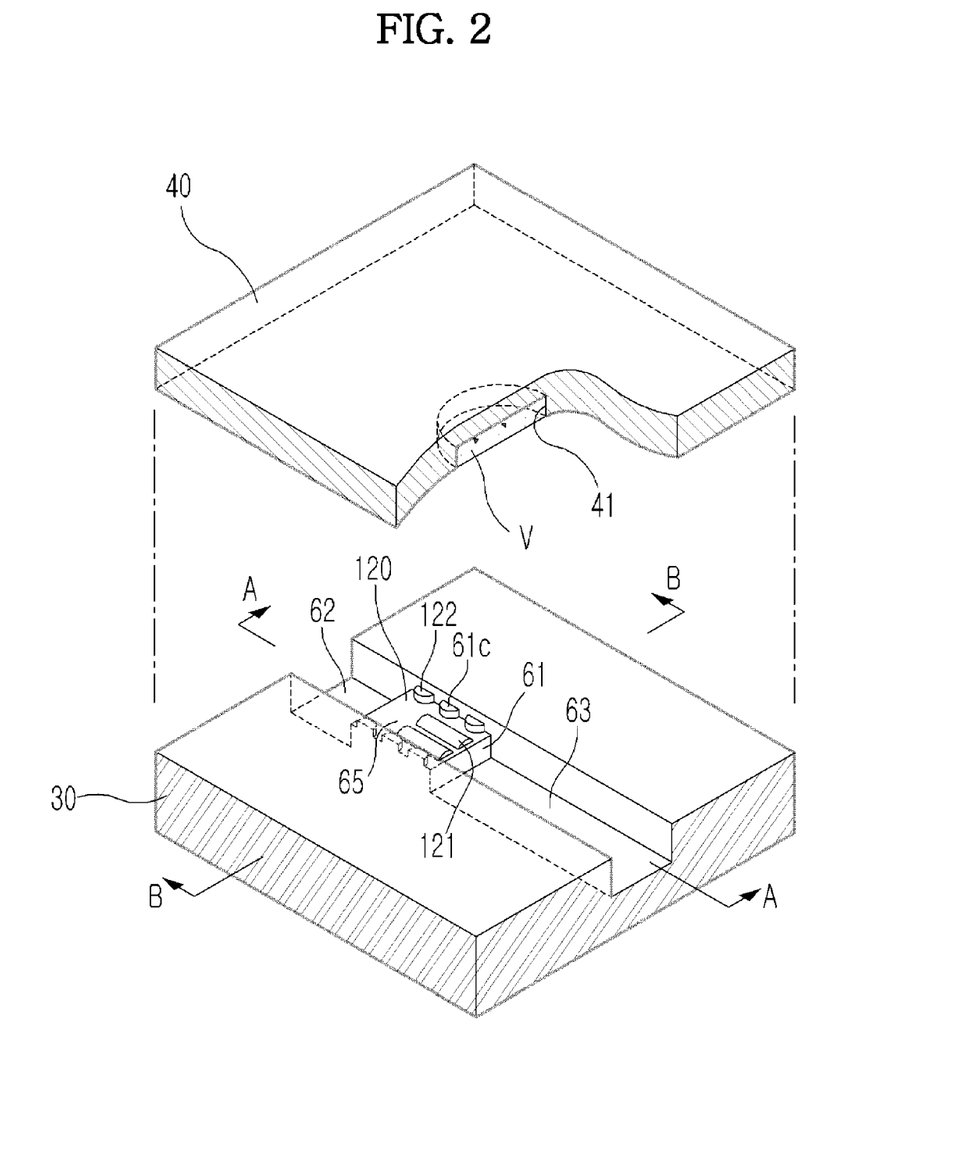
FIG. 2 is a perspective view illustrating a valve unit according to an exemplary embodiment, with first and second plates separated from the valve unit.
Figure 3:
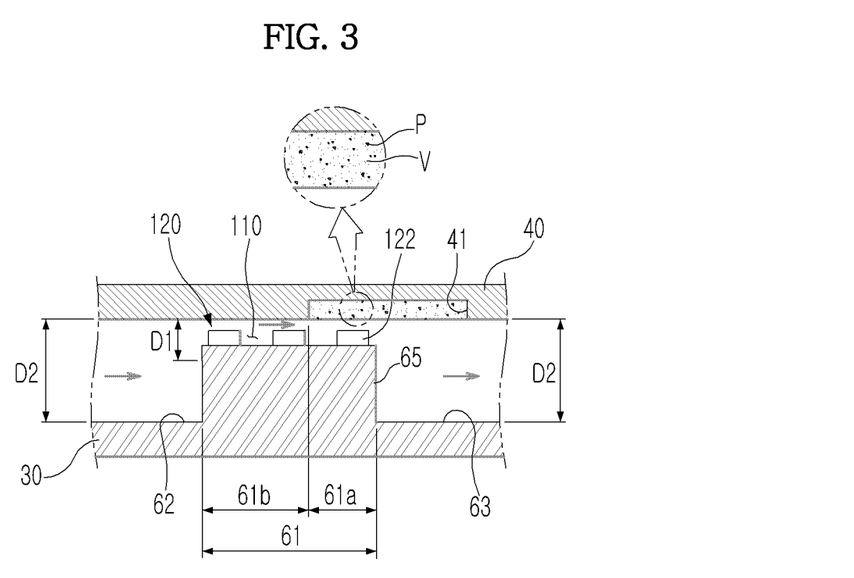
FIG. 3 is a cross-sectional view along direction A-A shown in FIG. 2.
Figure 4:
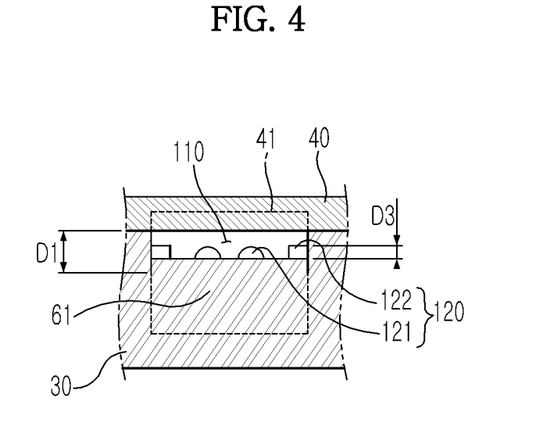
FIG. 4 is a cross-sectional view along direction B-B shown in FIG. 2.

FIG. 2 is a perspective view illustrating a valve unit according to an exemplary embodiment, with first and second plates separated from the valve unit, FIG. 3 is a cross-sectional view along direction A-A shown in FIG. 2, and FIG. 4 is a cross-sectional view along direction B-B shown in FIG. 2.

The valve unit according to the exemplary embodiment may be provided where the chamber meets the channel or anywhere along the length of the channel 60 of the microfluidic device 10. According to the foregoing exemplary embodiment, the valve unit provided in the middle of the channel is illustrated.

The channel 60 includes a first region 61 which extends downward from a top of the first plate 30, a second region 62 which extends downward from the top of the first plate to a depth deeper than the first region 61 and comes into contact with an end of the first region 61 in stepwise manner, and a third region 63 which extends downward from the top of the first plate to a depth deeper than the first region 61 and comes into contact with the other end of the first region 61 in a stepwise manner.

The second region 62 and the third region 63 have a depth D2 which is greater a depth D1 of the first region 61 Accordingly, a stepped structure 65 is formed in the first region 61 extending upward from a bottom of the channel 60.

As shown in FIGS. 2 and 3, the valve unit 100 according to the exemplary embodiment may include: a valve substance chamber 41 extending upward from a bottom of the second plate 40; a valve substance V to be received in a cured state in the valve substance chamber 41; a micro-channel part 110 which is provided above the stepped structure 65 formed in the first region 61 and through which the valve substance V fused in the valve substance chamber 41 by an external energy source flows to close a channel 60; and a fusion structure 120 which is protruded from the stepped structure 65 formed in the first region 61 and melts at a high temperature, enabling fused bonding of the micro-channel part 110.

The valve substance chamber 41 has a uniform depth and is formed in a cylindrical shape on the second plate 40. The valve substance V is accommodated in the valve substance chamber 41 in a cured state.

The valve substance V includes a phase transition material fused at a high temperature and a micro-exothermic material P including numerous particles which are dispersed in the phase transition material and absorb electromagnetic radiation from an external energy source 11 to generate heat.

The valve substance chamber 41 may contain the fused valve substance V injected using a dispenser (not shown) and this substance may be cured. The valve substance V may be prepared by admixing the phase transition material with numerous micro-exothermic particles, that is, the micro-exothermic material P and, when cured, may be adhered to the valve substance chamber 41.

The external energy source 11 for electromagnetic irradiation may be a laser source radiating a laser beam, a light emitting diode which radiates visible or infrared light, a xenon lamp, etc. In particular, the laser source may have at least one laser diode. The external energy source 11 may be selected on the basis of electromagnetic radiation wavelengths absorbed by the micro-exothermic material P contained in the valve substance V.

The external energy source 11 may further include an adjustment unit (not shown) to regulate a position or direction of the energy source so as to concentrate electromagnetic radiation toward a desired area of the microfluidic device 10, that is, multiple valve substance chambers 41. This adjustment unit may be movable along a radius of the microfluidic device 10 and embodied by a variety of mechanisms. The adjustment unit will be readily known to persons skilled in the art and, therefore, a detailed description thereof will be omitted for brevity.

The phase transition material may be wax which is fused by heating and transitions to a liquid phase, in turn being expanded in volume. The wax may include, for example, paraffin wax, microcrystalline wax, synthetic wax, natural wax, etc.

The phase transition material may be a gel or thermoplastic resin. The gel may include, for example, polyacrylamide, polyacrylate, polymethacrylate, polyvinylamide, etc. The thermoplastic resin may be selected from cyclic olefin copolymer (COC), polymethylmethacrylate (PMMA), polycarbonate (PC), polystyrene (PS), polyoxymethylene (POM), perfluoralkoxy (PFA), polyvinylchloride (PVC), polypropylene (PP), polyethylene tetraphthalate (PET), polyetheretherketone (PEEK), polyamide (PA), polysulfone (PSU), polyvinylidene fluoride (PVDF), and the like.

The exothermic material P may include numerous particles, each having a diameter sufficiently small to freely pass through a micro-channel 60. For example, the particles may have a diameter of 1 nm to 100 μm. The micro-exothermic material P is heated to rapidly elevate a temperature and generates heat when electromagnetic energy is provided by a laser, and is uniformly dispersed into the wax. In order to exhibit these features, the micro-exothermic material may have a core containing metal components and a hydrophobic shell structure. For instance, the micro-exothermic material may have an Fe based core and a specific molecular structure including plural surfactant components to be bonded to Fe in order to enclose the Fe.

In general, the micro-exothermic material P may be stored in a dispersed state in a carrier oil. In order to uniformly disperse the micro-exothermic material P having a hydrophobic surface structure in the carrier oil, the carrier oil may also be hydrophobic. The carrier oil containing the micro-exothermic material P dispersed therein is homogeneously mixed with a fused phase transition material, resulting in the valve substance V.

The micro-exothermic material P is not particularly limited to polymer beads, but may include at least one selected from quantum dots, magnetic beads, gold nanoparticles, silver nanoparticles, beads with metal composition, carbon particles, etc. The carbon particles may further include graphite granules. The micro-exothermic material P may be, for example, metal oxide particles such as $Al_2O_3$, $TiO_2$, $Ta_2O_3$, $Fe_2O_3$, $Fe_3O_4$, $HfO_2$, and the like.

In addition, the micro-exothermic material P may include a dye to absorb external electromagnetic radiation with a constant spectrum to generate heat. The dye is not particularly limited so long as the dye is a material having a structure miscible with the phase transition material. For instance, dyes with optical properties such as ADS905AM, infrared dyes such as a dye represented by $C_{62}H_{96}N_6SbF_6$ or Epolight2057 available from American Dye Source Inc., infrared dyes having absorption spectra suitable for near infrared sources available from Epolin Inc., and other dyes such as Epolight2180, Epolight 2189, carbon black, and so forth, may be employed.

The valve unit 100 is a normally open valve that normally leaves the channel 60 open and closes the channel 60 using the valve substance V when electromagnetic energy is emitted to the valve substance V contained in the valve substance chamber 41. A laser source 11 is an example of the energy source 11 and emits a laser L toward the valve substance V, in turn providing energy to the same. The laser source 11 may include a laser diode.

In the first and second plates 30 and 40, a part of the first region 61 is alternately aligned with the valve substance chamber 41 while the other part of the first region 61 is overlapped with the valve substance chamber 41. The overlapping part of the first region 61 is referred to as an overlap part 61a and the other part is referred to as a non-overlap part 61b.

A width and a stagger degree between the first region 61 and the valve substance chamber 41 may be set to form the non-overlap part 61b at each side of the valve substance 41. In the present exemplary embodiment, the width and the stagger degree between the first region 61 and the valve substance chamber 41 may be set to form the non-overlap part 61b at either side of the valve substance chamber 41.

When the valve substance V in the valve substance chamber 41 is fused, the fused valve substance V partially shifts to the channel 60 corresponding to the non-overlap part 61b by capillary action, in turn closing the channel 60, since a cross-sectional area of the channel 60 in the non-overlap part 61b is narrower than that of the channel 60 in the overlap part 61a. In other words, the non-overlap part 61b of the channel 60 may correspond to the micro-channel part 110.

At a top of the first region 61, the fusion structure 120 is formed and protruded toward the second plate 40.

The fusion structure 120 is formed using a resin material and melts at a predetermined temperature or more. Applying electromagnetic energy to a site corresponding to the fusion structure 120 outside of the microfluidic device 10, a temperature of the valve substance V coming into contact with the fusion structure 120 is elevated to at least a melting point of the fusion structure 120 and allows melting of the fusion structure, in turn enabling fused bonding of the micro-channel part 110. That is, the fusion structure 120 functions as a melting bump fused by heat. In this case, the height D1 of the micro-channel part may range from 5 to 100 µm.

As shown in FIGS. 2 to 4, the fusion structure 120 may include at least one first fusion structure 121 extended in a flow direction of a fluid not to prevent the fluid flow in the channel 60 and at least one second fusion structure 122 protruded inward of the channel from a lateral side 61c of the first region 61.

At least one first fusion structure 121 may be formed along direction B-B shown in FIG. 2 and, for example, two first fusion structures 121 are illustrated according to the exemplary embodiment.

At least one second fusion structure 122 may be formed along direction A-A shown in FIG. 2, for example, three second fusion structures 122 are illustrated according to the exemplary embodiment.

The second fusion structure 122 may take various forms, although the second fusion structure 122 according to the exemplary embodiment has a semi-cylindrical shape. Since the second fusion structure 122 is provided on the lateral side 61c, a decrease in a fused bonding property at the lateral side of the first region 61 may be inhibited during fused bonding.

A height of the fusion structure 120 may be substantially the same as the depth D1 of the first region 61 (that is, the height of micro-channel part) or, otherwise, be protruded to a desired level in a range of higher than a top of the first region 61 and up to the height D1 of the micro-channel part 110.

Figure 5A:
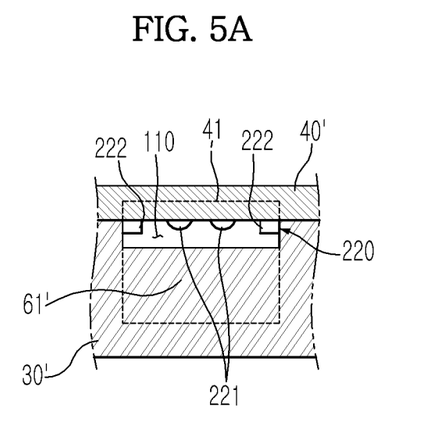
FIGS. 5A and 5B are cross-sectional views illustrating a fusion structure included in a valve unit according to an exemplary embodiment.
Figure 5B:
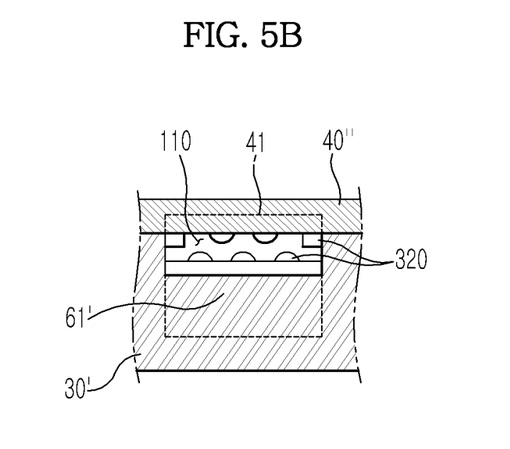

FIGS. 5A and 5B are cross-sectional views illustrating a fusion structure of a valve unit according to an exemplary embodiment.

As shown in FIG. 5A, a fusion structure 220 is not formed on a first plate 30' but may be protruded downward from a bottom of a second plate 40'. In this regard, a first fusion structure 221 and a second fusion structure 222 which correspond to that described in the foregoing exemplary embodiment may be provided on the bottom of the second plate 40'.

Alternatively, as shown in FIG. 5B, fusion structures 320 may be protruded from a top of the first region 61' and a bottom of the second plate 40", respectively.

It will be easily understood that shape, size and/or number of the fusion structures 220 and 230 is suitably selected according to practical experiments, so as to prevent fluid flow from being interrupted in a normally open condition while attaining optimum fused bonding effects.

The fusion structures 220 and 320 may be prepared using the same material as employed for the first plates 30 and 30' and/or the second plates 40, 40' and 40" and integrated with the same when the plates are injection molded.

Figure 6:
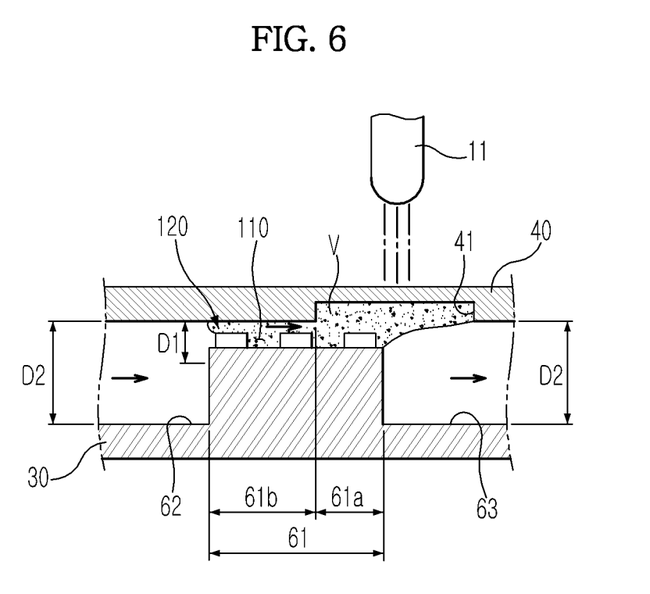
FIG. 6 is a cross-sectional view illustrating operation of a valve unit according to an exemplary embodiment.
Figure 7:
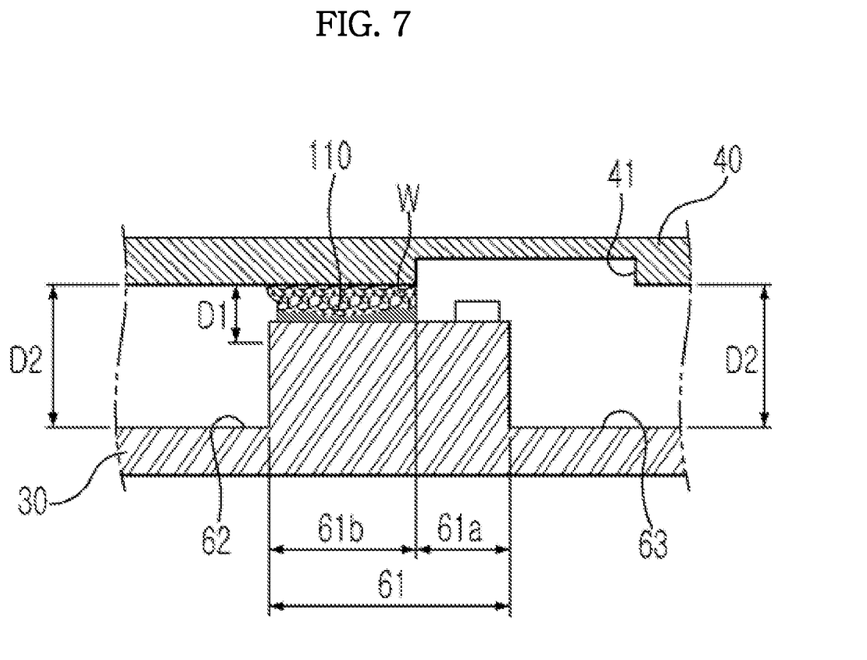
FIG. 7 is a cross-sectional view illustrating a channel closed by a valve unit according to an exemplary embodiment.

FIG. 6 is a cross-sectional view illustrating operation of a valve unit according to an exemplary embodiment, and FIG. 7 is a cross-sectional view illustrating a channel closed by a valve unit according to an exemplary embodiment.

FIG. 3 shows the valve substance chamber 41 containing a valve substance therein.

Here, when the valve substance V is fused by applying energy through laser irradiation, the fused substance V partially flows from the valve substance chamber 41 into the non-overlap part 61b of the first region 61 (that is, the micro-channel part) by capillary action and remains therein, as shown in FIG. 6.

Then, the micro-exothermic material P in the valve substance V generates heat by continuous electromagnetic irradiation and a temperature of the valve substance V is elevated to at least a melting point of the fusion structure 120, in turn melting the fusion structure 120 by the valve substance V remaining in the non-overlap part 61b.

After melting the fusion structure 120 and completing electromagnetic irradiation, the valve substance V and the fusion structure 120 are cured to form a fused part W and the first and second plates 30 and 40 are fused and bonded in the non-overlap part 61b (that is, the micro-channel part), in turn closing the channel 60, as shown in FIG. 7.

In this regard, with controlled laser irradiation width and time, the valve substance V is heated by laser irradiation one time at a certain position and flows into the non-overlap part 61b, and then, the valve substance V may undergo heating again so as to melt the fusion structure 120, thereby enabling fused bonding of the non-overlap part 61b. In other words, laser irradiation may be performed once at a single position so as to move the valve substance V to the non-overlap part 61b and enable fused bonding of the non-overlap part 61b.

In addition, the valve substance chamber 41 is subjected to laser irradiation to flow the valve substance V toward the non-overlap part 61b and, before the fusion structure 120 melts, the valve substance V is cured again by controlling the energy supplied to the fusion structure so as to close the channel 60. In such closed channel conditions, sample inspection may be performed. On the other hand, for some processes requiring high temperatures, such as DNA extraction, induction of polymerase chain reaction (PCR), etc., the micro-exothermic material P is heated by installing the laser outside of the microfluidic device 10 corresponding to the non-overlap part 61b and conducting electromagnetic irradiation and the valve substance V is fused at a high temperature to melt the fusion structure 120, in turn enabling fused bonding of the non-overlap part 61b. That is, the non-overlap part 61b may be selectively fused and bonded according to requirements.

Although the foregoing exemplary embodiment describes use of a laser to fuse the valve substance V and guide the fused valve substance V to the non-overlap part 61b, this process of fusing the valve substance V and flowing the same to the non-overlap part 61b may be performed using a heater (not shown) to heat the valve substance V without electromagnetic radiation, so as to fuse the valve substance V and guide the same to the non-overlap part 61b.

Afterward, in order to melt the non-overlap part 61b, the valve substance V flowed to the non-overlap part 61b is subjected to laser irradiation to heat the micro-exothermic material P so as to heat and melt the fusion structure 120, in turn enabling fused bonding of the non-overlap part 61b and completely closing the channel 60.

Next, a detailed description will be given of a microfluidic device equipped with the valve unit according to another exemplary embodiment.

Figure 8:
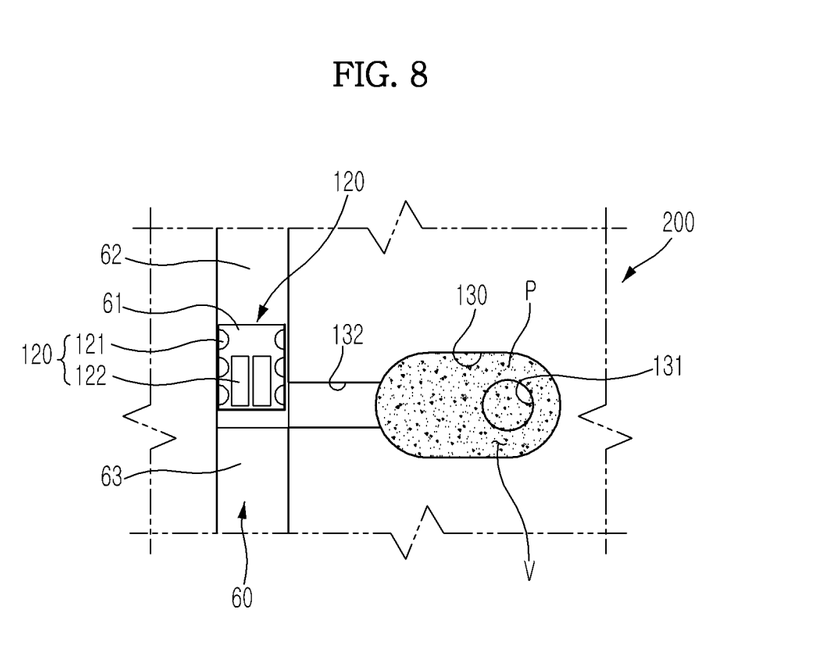
FIG. 8 is a cross-sectional view illustrating a valve unit according to another exemplary embodiment.
Figure 9:
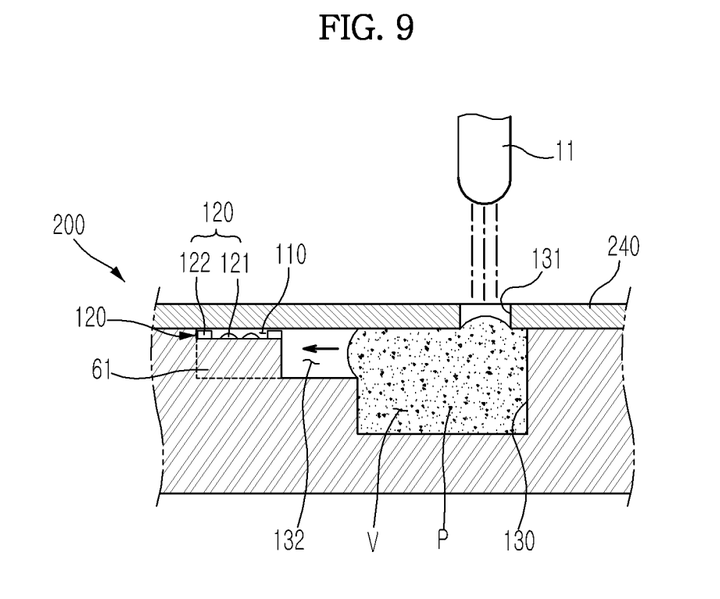
FIGS. 9 and 10 are cross-sectional views illustrating behavior of a valve unit according to another exemplary embodiment.
Figure 10:
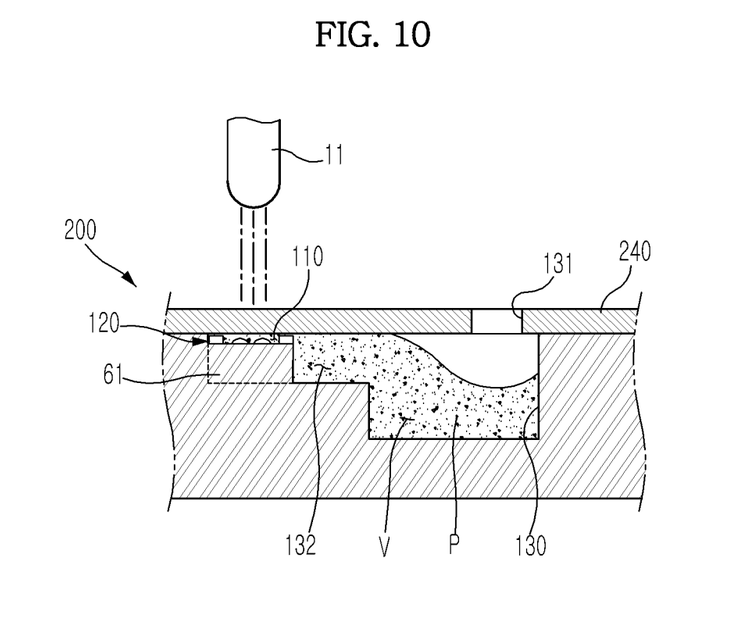

FIG. 8 is a cross-sectional view illustrating a valve unit according to another exemplary embodiment, and FIGS. 9 and 10 are cross-sectional views illustrating behavior of the valve unit according to another exemplary embodiment.

The valve unit of the present exemplary embodiment may be mounted on the same microfluidic device according to the previously described exemplary embodiment (hereafter referred to as 'first embodiment'), however, be formed in a different shape. Hereinafter, with regard to the same configurations as described in the first embodiment, the same numerical symbols are used and a detailed description thereof will be omitted for brevity.

As shown in FIGS. 8 to 10, the valve unit 200 of the present exemplary embodiment (referred to as 'second embodiment') includes: a valve substance chamber 130 engraved downward from a first plate 230 at a site adjacent to a channel 60; a valve substance V which is contained in a cured state in the valve substance chamber 130; a guidance channel 132 to guide the valve substance V, which was fused in the valve substance chamber 130 by an external energy source, toward the channel 60; a micro-channel part 110 provided above a first region 61 to receive the valve substance V having flowed from the guidance channel 132; and a fusion structure 120 protruded from the first region 61, which melts at a high temperature to enable fused bonding of the micro-channel part 110.

The valve substance chamber 130 is connected to the middle of the channel 60 and receives the valve substance V, wherein the valve substance V is initially in a solid state in the valve substance chamber 130 at room temperature and is then fused and expanded by heating in order to flow into the channel 60 via the guidance channel 132, and lastly, solidified again in the channel 60 to block fluid flow in the same.

The valve substance V is prepared as described in the first embodiment and the energy source used for electromagnetic irradiation of the valve substance V is substantially the same as described in the first embodiment.

When the valve substance in the valve substance chamber 130 is fused, the fused valve substance V flows into the micro-channel part 110 by capillary action since a cross-sectional area of the channel 60 in the micro-channel part 110 is smaller than that of the guidance channel 132, so as to close the channel 60. Here, the cross-sectional area of the guidance channel 132 is not particularly limited so long as the guidance channel 132 functions to guide the fused valve substance V to the micro-channel part 110.

A second plate 240 may have a through hole 131 corresponding to the valve substance chamber 130 so as to facilitate electromagnetic irradiation of the valve substance V.

The fusion structure 120 may be protruded from a top of the first region 61 which is substantially the same as described in the first embodiment or the modified embodiment. In particular, a shape, size and/or number of the fusion structure 120 may be suitably selected to prevent a fluid flow from being interrupted when the fusion structure is normally open, while attaining optimum fused bonding effects.

Accordingly, when the valve substance V in the valve substance chamber 130 is subjected to electromagnetic irradiation, the micro-exothermic material P absorbs electromagnetic radiation to heat the phase transition material. As a result, the valve substance V is fused and expanded in volume, and flows into the micro-channel part 110 formed in the first region 61 of the channel 60, via the guidance channel 132. Next, the valve substance V having flowed into the micro-channel part 110 is heated up to at least a melting point of the fusion structure 120 by electromagnetic radiation in order to melt the fusion structure 120 and enable fused bonding of the micro-channel part 110, in turn permanently closing the channel 60.

The valve unit according to the second embodiment may be driven by the same process applied to the valve unit according to the first embodiment.

According to the first embodiment, the valve substance chamber is provided in the second plate and, if a microfluidic device configured with a complicated flow path is used, the flow path is easily arranged. On the other hand, according to the second embodiment, the valve substance chamber is provided in the first plate so as to reduce a thickness of the second plate, thereby fabricating a microfluidic device with a more compact configuration.

Although a few exemplary embodiments have been shown and described in conjunction with accompanying drawings, it is clearly understood that the foregoing exemplary embodiments have been proposed for illustrative purpose only and do not particularly restrict the scope of the inventive concept. Accordingly, it would be appreciated by those skilled in the art that various substitutions, variations and/or modifications may be made in these exemplary embodiments without departing from the principles and spirit inventive concept and the exemplary embodiments are not particularly restricted to particular configurations and/or arrangements described or illustrated above.

What is claimed is:

1. A valve unit for opening and closing a channel, the valve unit comprising:
   a valve substance comprising a phase transition material;
   a valve substance chamber which communicates with the channel and in which the valve substance is disposed; and
   a fusion structure formed in a section of the channel,
   wherein when the valve substance contained in the valve substance chamber is fused by applied energy and flows into the section of the channel in which the fusion structure is formed, and the valve substance is heated to melt the fusion structure and conduct fused bonding of the channel, thereby closing the channel.

2. The valve unit according to claim 1, further comprising a stepped structure formed in the channel and on which the fusion structure is formed, the stepped structure forming a micro-channel part in the channel.

3. The valve unit according to claim 2, wherein the valve unit is provided on a rotational disk type microfluidic device, and the microfluidic device includes a first plate and a second plate combined with the first plate to isolate the channel from the valve substance chamber.

4. The valve unit according to claim 2, further comprising a guidance channel which connects the valve substance chamber to the micro-channel part to guide the fused valve substance to the micro-channel part when the valve substance in the valve substance chamber is fused.

5. The valve unit according to claim 2, wherein the fusion structure comprises at least one first fusion structure protruded from the stepped structure into the micro-channel part and extended in a longitudinal direction of the channel.

6. The valve unit according to claim 5, wherein the fusion structure comprises a second fusion structure disposed on the stepped structure protruded from a lateral side of the micro-channel part.

7. The valve unit according to claim 3, wherein the first and second plates are formed using thermoplastic resin.

8. The valve unit according to claim 2, wherein the valve substance further comprises a micro-exothermic material which is dispersed in the phase transition material and absorbs electromagnetic radiation to emit heat energy.

9. The valve unit according to claim 8, wherein the micro-exothermic material is at least one selected from a group consisting of polymer beads, quantum dots, gold nanoparticles, silver nanoparticles, metallic compound beads, carbon particles and magnetic beads.

10. The valve unit according to claim 8, wherein the micro-exothermic material is metal oxide particles.

11. The valve unit according to claim 8, wherein the micro-exothermic material includes dyes generating heat in response to electromagnetic irradiation.

12. The valve unit according to claim 2, wherein the phase transition material is at least one selected from a group consisting of wax, gel and thermoplastic resins.

13. The valve unit according to claim 12, wherein the wax comprises at least one selected from paraffin wax, microcrystalline wax, synthetic wax and natural wax.

14. The valve unit according to claim 12, wherein the gel comprises at least one selected from polyacrylamide, polyacrylate, polymethacrylate and polyvinylamide.

15. The valve unit according to claim 12, wherein the thermoplastic resin comprises at least one selected from cyclic olefin copolymer (COC), polymethylemthacrylate (PMMA), polycarbonate (PC), polystyrene (PS), polyoxymethylene (POM), perfluoroalkoxy (PFA), polyvinylchloride (PVC), polypropylene (PP), polyethylene terephthalate (PET), polyetheretherketone (PEEK), polyamide (PA), polysulfone (PSU) and polyvinylidene fluoride (PVDF).

16. The valve unit according to claim 2, wherein a height of the channel ranges from 0.01 to 1.0 mm.

17. The valve unit according to claim 2, wherein a height of the micro-channel part ranges from 5 to 100 μm.

18. The valve unit according to claim 2, wherein a smaller cross-sectional area of the micro-channel part is smaller than a cross-sectional area of other sections of the channel.

19. A microfluidic device comprising:
   a channel to provide a flow path of a fluid; and
   a valve unit to open and close the channel,
   wherein the valve unit comprises:
   a valve substance comprising a phase transition material;
   a valve substance chamber which communicates with the channel and in which the valve substance is disposed; and
   a fusion structure formed in a section of the channel,
   wherein the valve substance contained in the valve substance chamber is fused by applied energy and flows into the section of the channel in which the fusion structure is formed, and the valve substance flowed into the section of the channel in which the fusion structure is formed is heated to melt the fusion structure and conduct fused bonding of the channel.

20. The microfluidic device according to claim 19, wherein the valve substance further comprises a micro-exothermic material which is dispersed in the phase transition material and absorbs electromagnetic radiation to emit heat energy.

21. The microfluidic device according to claim 19, wherein the valve unit further comprises a stepped structure formed in the section of the channel and on which the fusion structure is formed, the stepped structure forming a micro-channel part having a cross-sectional area which is narrower than a cross-sectional area of other sections of the channel.

22. The microfluidic device according to claim 19, wherein the fusion structure is integrated with the microfluidic device by injection molding.

23. The microfluidic device according to claim 21, wherein heat or electromagnetic energy is applied to the valve substance to fuse the valve substance and thereby cause the fused valve substance to flow into the micro-channel part.

24. The microfluidic device according to claim 21, wherein the fusion structure comprises at least one first fusion structure extended in a longitudinal direction of the channel, and a second fusion structure protruded from a lateral side of the micro-channel part.

25. A method of driving a valve unit assembly which comprises a channel to provide a flow path of a fluid, a valve unit to open and close the channel, a valve substance chamber in which a phase transferable valve substance is disposed, and a fusion structure formed in a section of the channel, the method comprising:
   applying energy to the valve substance disposed in the valve substance chamber to thereby fuse the valve substance;
   flowing the fused valve substance into the section of the channel in which the fusion structure is formed; and heating the valve substance flowed into the section of the channel in which the fusion structure is formed to at least a melting point of the fusion structure to close the channel by fused bonding.

26. The method according to claim 25, wherein the valve substance comprises a phase transition material and a micro-exothermic material which is dispersed in the phase transition material, and the heating of the valve substance comprises applying electromagnetic energy to the valve substance to heat the micro-exothermic material.

27. The method according to claim 25, wherein the applying the energy to the valve substance comprises driving a non-contact heater for a constant time to heat the valve substance.

28. The method according to claim 25, wherein the applying the energy to the valve substance comprises applying electromagnetic energy using a light source to heat the valve substance.

29. The method according to claim 25, wherein a cross-sectional area of the section of the channel in which the fusion structure is formed is narrower than a cross-sectional area of other sections of the channel so as to flow the fused valve substance through capillary action.

30. The method according to claim 25, wherein the applying the energy to the valve substance disposed in the valve substance chamber and the heating the valve substance flowed into the section of the channel in which the fusion structure is formed are performed by continuous electromagnetic irradiation.

31. A microfluidic device comprising:
a channel to provide a flow path of a fluid;
a valve unit to open and close the channel; and
an energy source which irradiates the valve unit with electromagnetic energy,
wherein the valve unit comprises:
a valve substance chamber which communicates with the channel;
a valve substance which comprises a phase transition material and is disposed in the valve substance chamber;
a stepped structure which is provided in the channel to form a micro-channel part in the channel; and
a fusion structure which is disposed on the stepped structure, and
wherein the energy source irradiates the valve unit with electromagnetic energy such that the valve substance contained in the valve substance chamber is fused and flows into the micro-channel part, and the valve substance flowed into the micro-channel part is heated to melt the fusion structure, thereby closing the channel.

\* \* \* \* \*